US010628246B1

(12) United States Patent
Roth

(10) Patent No.: US 10,628,246 B1
(45) Date of Patent: Apr. 21, 2020

(54) METHODS AND SYSTEMS FOR PRIORITIZING CORRECTIVE ACTIONS IN A TROUBLESHOOTING CHART

(71) Applicant: The Boeing Company, Seal Beach, CA (US)

(72) Inventor: Scott Allen Roth, Bonney Lake, WA (US)

(73) Assignee: THE BOEING COMPANY, Chicago, IL (US)

( * ) Notice: Subject to any disclaimer, the term of this patent is extended or adjusted under 35 U.S.C. 154(b) by 1159 days.

(21) Appl. No.: 13/898,036

(22) Filed: May 20, 2013

(51) Int. Cl.
*G06F 11/07* (2006.01)

(52) U.S. Cl.
CPC .................. *G06F 11/0709* (2013.01)

(58) Field of Classification Search
CPC ............... G06F 11/0709; H04L 29/06
USPC ...... 702/19, 79, 179, 183, 184, 186; 714/19; 709/219
See application file for complete search history.

(56) References Cited

U.S. PATENT DOCUMENTS

| | | | |
|---|---|---|---|
| 4,811,124 A | 3/1989 | Dujari et al. | |
| 4,866,712 A * | 9/1989 | Chao ..................... | G06F 11/076 714/704 |
| 5,533,093 A * | 7/1996 | Horton ..................... | H04M 1/24 379/21 |
| 5,557,549 A * | 9/1996 | Chang .................. | F25J 3/04848 700/83 |
| 5,606,313 A | 2/1997 | Allen et al. | |
| 5,721,816 A * | 2/1998 | Kusbel ................... | G11B 20/18 360/53 |
| 5,835,730 A | 11/1998 | Grossman et al. | |
| 6,044,482 A | 3/2000 | Wong | |
| 6,122,575 A * | 9/2000 | Schmidt .............. | G06F 11/2252 244/1 R |
| 6,272,116 B1 | 8/2001 | Kurihara | |
| 7,185,075 B1 * | 2/2007 | Mishra .................... | H04L 12/24 379/207.01 |
| 7,257,095 B2 | 8/2007 | Liu | |
| 7,522,677 B2 | 4/2009 | Liang | |
| 2002/0059269 A1 * | 5/2002 | McQuown .......... | B61L 27/0094 |
| 2002/0138184 A1 * | 9/2002 | Kipersztok ........ | G05B 23/0278 701/32.9 |
| 2003/0069943 A1 * | 4/2003 | Bahrs ...................... | H04L 29/06 709/219 |
| 2003/0097125 A1 * | 5/2003 | Hall .................... | A61B 18/1233 606/34 |
| 2003/0103554 A1 | 6/2003 | Li et al. | |
| 2003/0206559 A1 | 11/2003 | Trachewsky et al. | |
| 2004/0236547 A1 * | 11/2004 | Rappaport ............ | G06F 17/509 703/2 |

(Continued)

*Primary Examiner* — Lisa E Peters
(74) *Attorney, Agent, or Firm* — Armstrong Teasdale LLP

(57) ABSTRACT

Methods and systems are provided for prioritizing a plurality of maintenance corrective actions in a troubleshooting chart for a device are provided. The method includes receiving, by a processor, an input from a user indicative of a successful corrective action from the plurality of corrective actions on the troubleshooting chart and incrementing a value of a counter associated with the successful corrective action. The processor then compares values for counters associated with each of the plurality of corrective actions and displays the plurality of corrective actions in hierarchal order based on the values of the counters.

20 Claims, 5 Drawing Sheets

(56) References Cited

U.S. PATENT DOCUMENTS

| | | | |
|---|---|---|---|
| 2005/0180804 A1* | 8/2005 | Andrew | G06K 5/02 |
| | | | 400/703 |
| 2006/0161819 A1* | 7/2006 | Nissan-Messing | |
| | | | G06F 11/0793 |
| | | | 714/48 |
| 2006/0240798 A1 | 10/2006 | Jarosinski et al. | |
| 2007/0082647 A1 | 4/2007 | Behzad et al. | |
| 2008/0198666 A1 | 8/2008 | Nygren | |
| 2008/0300828 A1* | 12/2008 | Kojima | G05B 23/0267 |
| | | | 702/184 |
| 2010/0223499 A1* | 9/2010 | Panigrahy | G06F 11/0709 |
| | | | 714/19 |
| 2011/0046842 A1* | 2/2011 | Smith | G07C 5/006 |
| | | | 701/31.4 |
| 2011/0178610 A1* | 7/2011 | O'Connor | G06Q 10/06 |
| | | | 700/30 |
| 2012/0116630 A1* | 5/2012 | Howell | G06Q 10/0639 |
| | | | 701/29.4 |

* cited by examiner

METHODS AND SYSTEMS FOR PRIORITIZING CORRECTIVE ACTIONS IN A TROUBLESHOOTING CHART

STATEMENT REGARDING FEDERALLY SPONSORED RESEARCH & DEVELOPMENT

This invention was made with Government support under F-22/FASTeR contract FA8611-08-C-2897 awarded by the Department of Defense. The government has certain rights in this invention.

BACKGROUND

The field of the disclosure relates generally to troubleshooting charts, and more specifically, to methods and systems for prioritizing corrective actions for known faults in troubleshooting charts.

Troubleshooting a system, a device, and/or, an apparatus often involves a maintenance person using a troubleshooting chart that outlines a known problem and a list of potential solutions for the problem. Known troubleshooting charts are often displayed in multiple forms, including on paper, in a book, or on a mobile computing device, such as a mobile phone. A user typically begins with the first solution on the chart and works through the possible solutions until a solution is successful. Such troubleshooting charts may be inefficient as the user may be directed to perform solutions that are too basic for the problem and/or that are clearly not the proper solution. Moreover, different users may solve the problem differently based on their technical background and/or experience, so different users may find different solutions in the troubleshooting chart applicable to the same problem. Additionally, physical and/or environmental conditions at different locations may vary, altering the applicable solution to a problem.

BRIEF DESCRIPTION

In one implementation, a method is provided for prioritizing a plurality of maintenance corrective actions in a troubleshooting chart for a device. The method includes receiving, by a processor, an input from a user indicative of a successful corrective action from the plurality of corrective actions on the troubleshooting chart and incrementing a value of a counter associated with the successful corrective action. The processor then compares values for counters associated with each of the plurality of corrective actions and displays the plurality of corrective actions in hierarchal order based on the values of the counters.

In another implementation, a device for use in prioritizing a plurality of maintenance corrective actions in a troubleshooting chart for a component is provided. The device includes a memory for storing data and a processor in communication with said memory. The processor programmed to receive an input from a user indicating a successful corrective action from the plurality of corrective actions on the troubleshooting chart and increment a value of a counter associated with the successful corrective action. The processor is also programmed to compare values for counters associated with each of the plurality of corrective actions display the plurality of corrective actions in hierarchal order based on the values of the counters.

In yet another implementation, a computer-readable storage device having encoded thereon computer readable instructions that are executable by a processor to perform functions including displaying a troubleshooting chart for a component, the troubleshooting chart including a plurality of maintenance corrective actions, receiving an input from a user indicating a successful corrective action from the plurality of corrective actions, and incrementing a value of a counter associated with the successful corrective action. The processor also performs functions including comparing values for counters associated with each of the plurality of corrective actions and displaying the plurality of corrective actions in hierarchal order based on the values of the counters.

DETAILED DESCRIPTION

Figure 1:
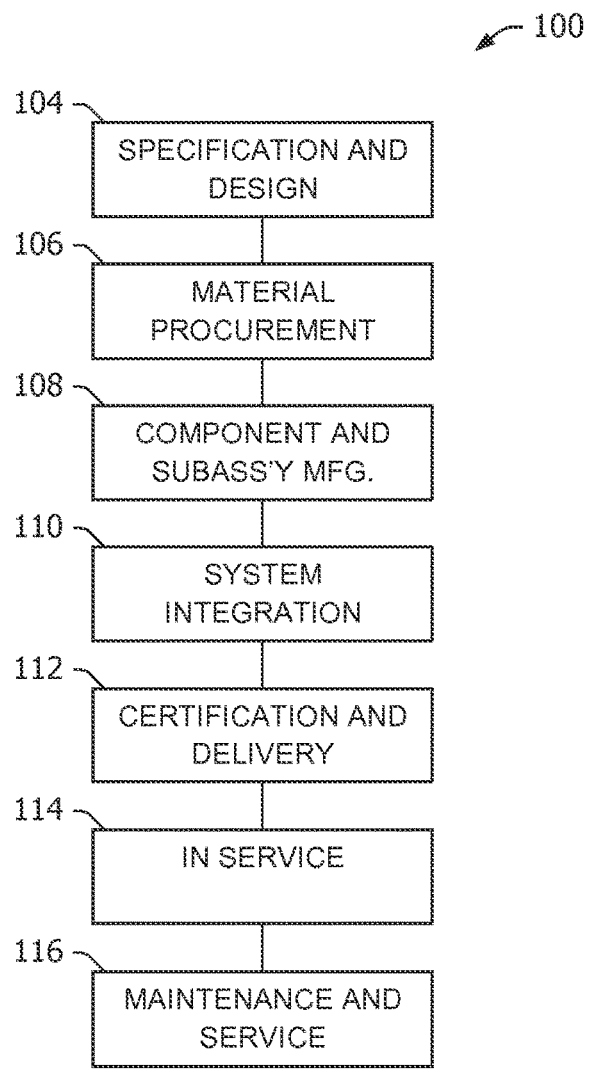
FIG. 1 is a flow diagram of an exemplary aircraft production and service methodology.
Figure 2:
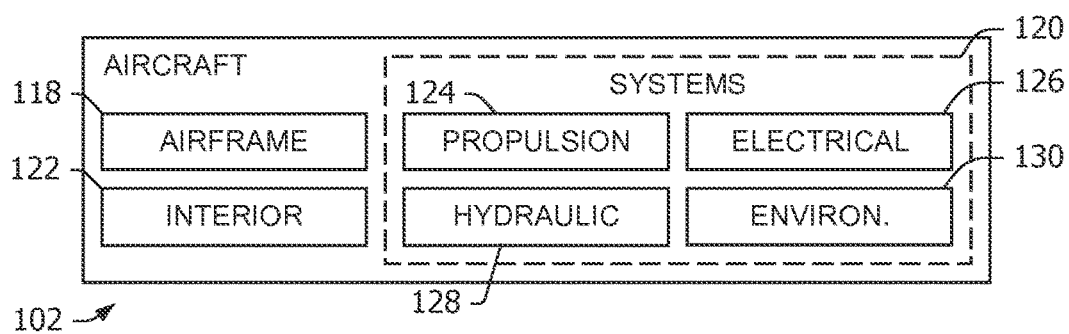
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of the aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, an aircraft 102 produced via method 100 may include an airframe 118 having a plurality of systems 120 and an interior 122. Examples of high-level systems 120 include one or more of a propulsion system 124, an electrical system 126, a hydraulic system 126, and/or an environmental system 130. Any number of other systems may be included. Although an aircraft example is shown, the principles of the invention may be applied to non-aviation industries, such as the automotive industry and/or other service industries that employ troubleshooting methodologies.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

Figure 3:
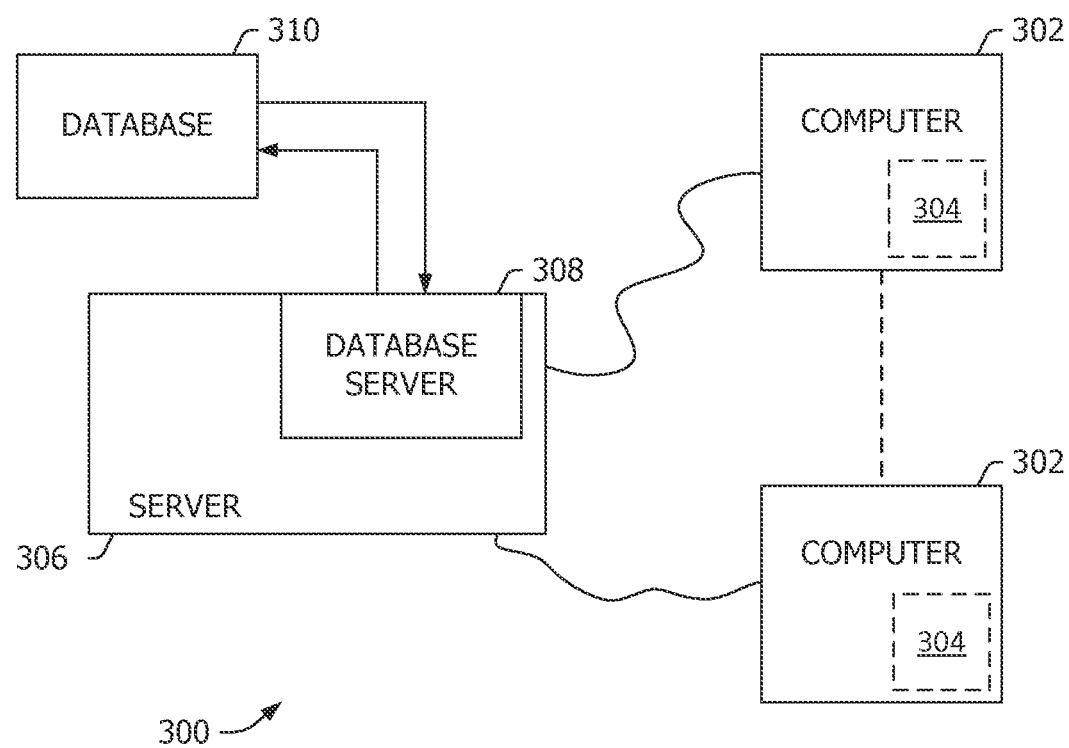
FIG. 3 is a diagram of an exemplary system for maintaining a troubleshooting chart.

FIG. 3 is a simplified block diagram of an exemplary troubleshooting system 300 including a plurality of computer devices in accordance with one implementation of the present invention. In the exemplary implementation, system 300 includes at least one mobile computing device 302 having a troubleshooting module 304. As described below in more detail, troubleshooting module 304 is configured to automatically prioritize corrective actions associated with a specified fault in a troubleshooting chart.

More specifically, in the exemplary implementation, system 300 includes a server computing device 306, which is a type of computer system, and mobile computing devices 302 coupled to server computing device 306. In one implementation, mobile computing devices 302 are computers including a web browser and a memory device, such that server computing device 306 is accessible to mobile computing devices 302 using the Internet. Mobile computing devices 302 are interconnected to the Internet through many interfaces including a network, such as a local area network (LAN) or a wide area network (WAN), dial-in-connections, cable modems, and special high-speed ISDN lines. Mobile computing devices 302 could be any device capable of interconnecting to the Internet including a web-based phone, smartphone, PDA, iPhone® (iPhone is a registered trademark of Apple, Incorporated located in Cupertino, Calif.), Android® device (Android is a registered trademark of Google Incorporated located in Mountain View, Calif.), and/or any device capable of executing stored computer-readable instructions.

A database server 308 is connected to a database 310, which contains information on a variety of matters, as described below in greater detail. In one implementation, centralized database 310 is stored on server computing device 306 and can be accessed by users using one of mobile computing devices 302 by logging onto server computing device 306 through one of mobile computing devices 302. In an alternative implementation, database 310 is stored remotely from server computing device 306 and may be non-centralized. Database 310 may store troubleshooting chart data including update data, history data, and counter data.

In the exemplary implementation, each mobile computing device 302 includes a troubleshooting module 304. Troubleshooting module 304 is configured to receive and store data associated with a plurality of troubleshooting charts for a device. Troubleshooting module 304 enables mobile computing device 302 to automatically prioritize corrective actions associated with a specified fault in a troubleshooting chart.

Figure 4:
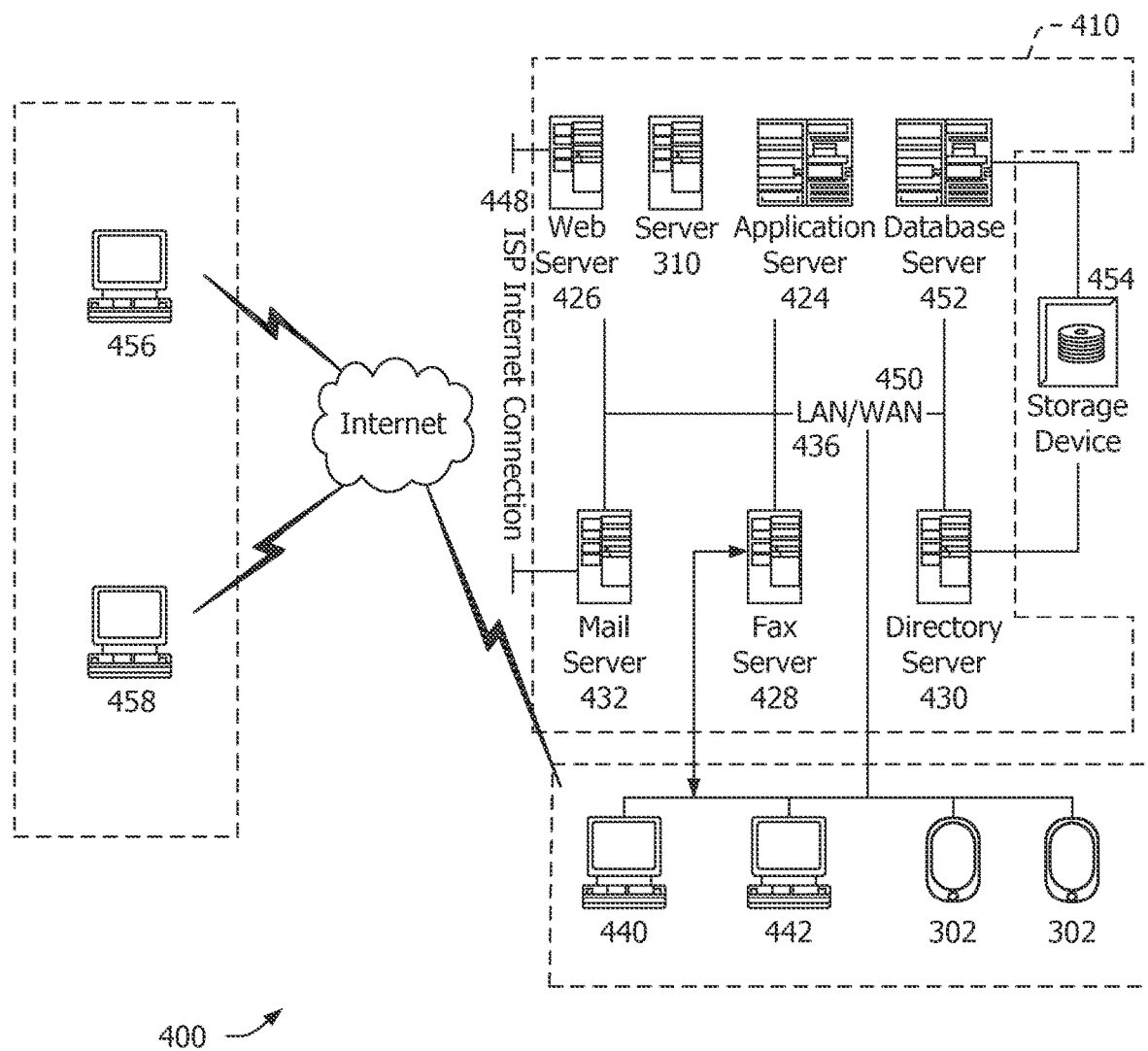
FIG. 4 is an expanded block diagram of a server architecture of a computer system.

FIG. 4 is an expanded block diagram of a server architecture of a computer system 400. System 300, or at least the functionality of system 300 as described above, may be included within system 400. Components in system 400, identical to components of system 300 (shown in FIG. 3), are identified in FIG. 4 using the same reference numerals used in FIG. 3.

Referring specifically to FIG. 4, system 400 includes server group 410 and mobile computing devices 302. Server group 410 includes a database server 452, an application server 424, a web server 426, a fax server 428, a directory server 430, a mail server 432, and server computing device 306. A disk storage unit containing database 454 is coupled to database server 452 and directory server 430. Servers 424, 426, 428, 430, 432, and 450 are communicatively coupled in a local area network (LAN) 436. In addition, mobile computing devices 440 and 442, and mobile computing devices 302 are coupled to LAN 436. Alternatively, mobile computing devices 440 and 442, and mobile computing devices 302 are coupled to LAN 436 using an Internet link or are connected through an intranet. Each mobile computing device, 440 and 442, is a computing device having a troubleshooting application.

Server group 410 is configured to be communicatively coupled to entities outside LAN 436 as well, such as computing devices 456 and 458 using an Internet connection 448. Any other wide area network (WAN) type communication can be utilized in other implementations. In addition, and rather than WAN 450, local area network 436 could be used in place of WAN 450.

In some implementations, any authorized individual or entity having a workstation computing device 440, 442, 456, 458 may access system 400. At least one of the computer systems includes a manager workstation computing device 456 located at a remote location. Workstation computing devices 456 and 458 are configured to communicate with server group 410. Server computing device 306, which is in communication with mobile computing devices 302, receives and transmits information to and from mobile computing devices 302, as well as computing devices 440 and 442. It should be understood that any number of mobile computing devices may be included in the systems of FIGS. 3 and 4.

References herein to mobile computing device 302 initiating or executing application software, for example troubleshooting software, should be interpreted to mean that, in some implementations, the application software is stored entirely in the memory of and executed exclusively by a processor in mobile computing device 302, whereas in other implementations, the application software has a client-server architecture. In implementations where the application software has a client-server architecture, mobile computing device 302 executes a client component of the application software, for example in a web browser, and one or more servers, for example web server 426, executes a server component of the application software.

Figure 5:
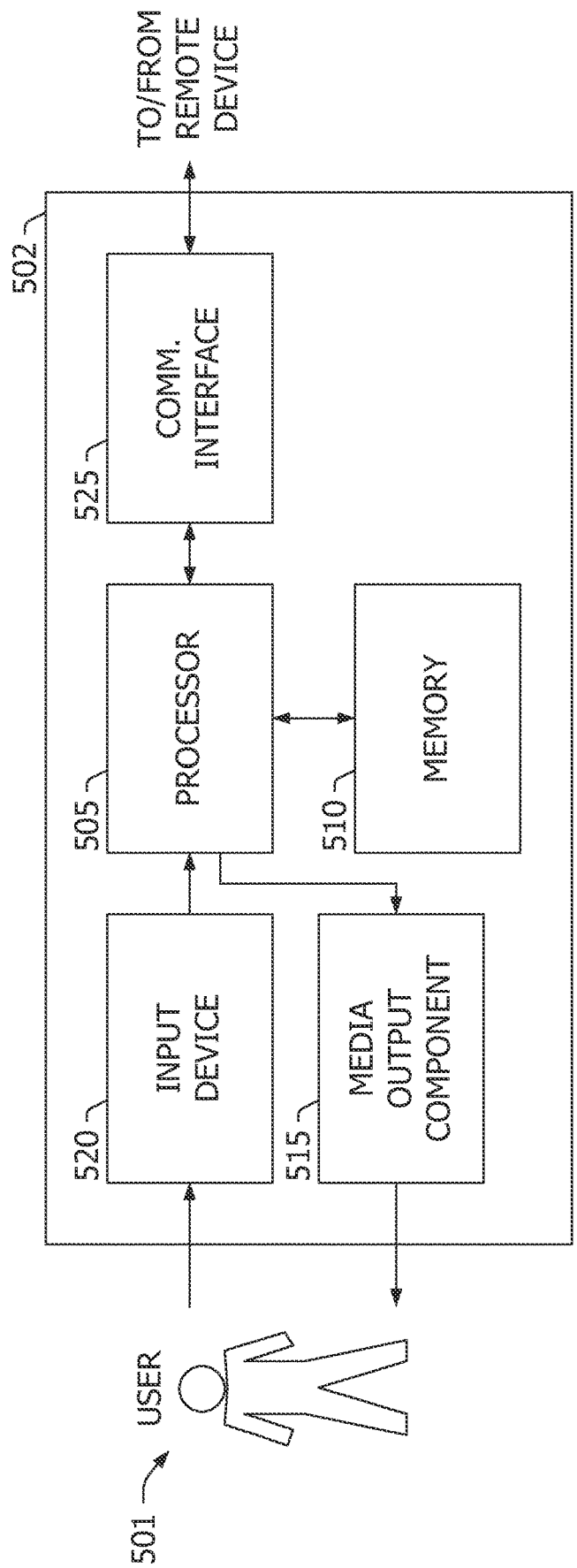
FIG. 5 illustrates an exemplary configuration of a mobile computing device.

FIG. 5 illustrates an example configuration of a computing device 502. Computing device 502 is representative of any of mobile computing devices 302, server computing device 306 and servers 424, 426, 428, 430, 432, and 452 of server group 410, and computing devices 440, 442, 456, and 458 as shown in FIGS. 3 and 4. Referring specifically to FIG. 5, computing device 502 includes a processor 505 for executing instructions. In some implementations, executable instructions are stored in a memory 510. Processor 505 includes one or more processing units (e.g., in a multi-core configuration). Memory 510 is any device allowing information such as executable instructions and/or data to be stored and retrieved. Memory 510 may include one or more computer readable storage devices or other computer readable media, including transitory and non-transitory computer readable media.

Computing device 502 also includes at least one media output component 515 for presenting information to user 501. Media output component 515 is any component capable of conveying information to user 501. In some implementations, media output component 515 includes an output adapter such as a video adapter and/or an audio adapter. An output adapter is operatively coupled to processor 505 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones). In some implementations, at least one such display device and/or audio device is included in media output component 515.

In some implementations, computing device 502 includes an input device 520 for receiving input from user 501. Input device 520 may include, for example, a keyboard, a keypad, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 515 and input device 520.

Still referring to FIG. 5, computing device 502 may also include a communication interface 525, which is communicatively couplable to a remote computing device such as any servers of server group 410. Communication interface 525 includes, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory 510 are, for example, processor-executable instructions for providing a user interface to user 501 via media output component 515 and, optionally, receiving and processing input from input device 520. Memory 510 includes, but is not limited to, any computer-operated hardware suitable for storing and/or retrieving computer-executable instructions and/or data. Memory 510 may include random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). Further, memory 510 may include multiple storage units such as hard disks or solid state disks in a redundant array of inexpensive disks (RAID) configuration. Memory 510 may include a storage area network (SAN) and/or a network attached storage (NAS) system. In some implementations, memory area 510 includes memory that is integrated in mobile computing device 502. For example, mobile computing device 502 may include one or more hard disk drives as memory 510. Memory 510 may also include memory that is external to mobile computing device 502 and may be accessed by a plurality of computing devices 502. The above memory types are exemplary only, and are thus not limiting as to the types of memory usable for storage of processor-executable instructions and/or data.

Figure 6:
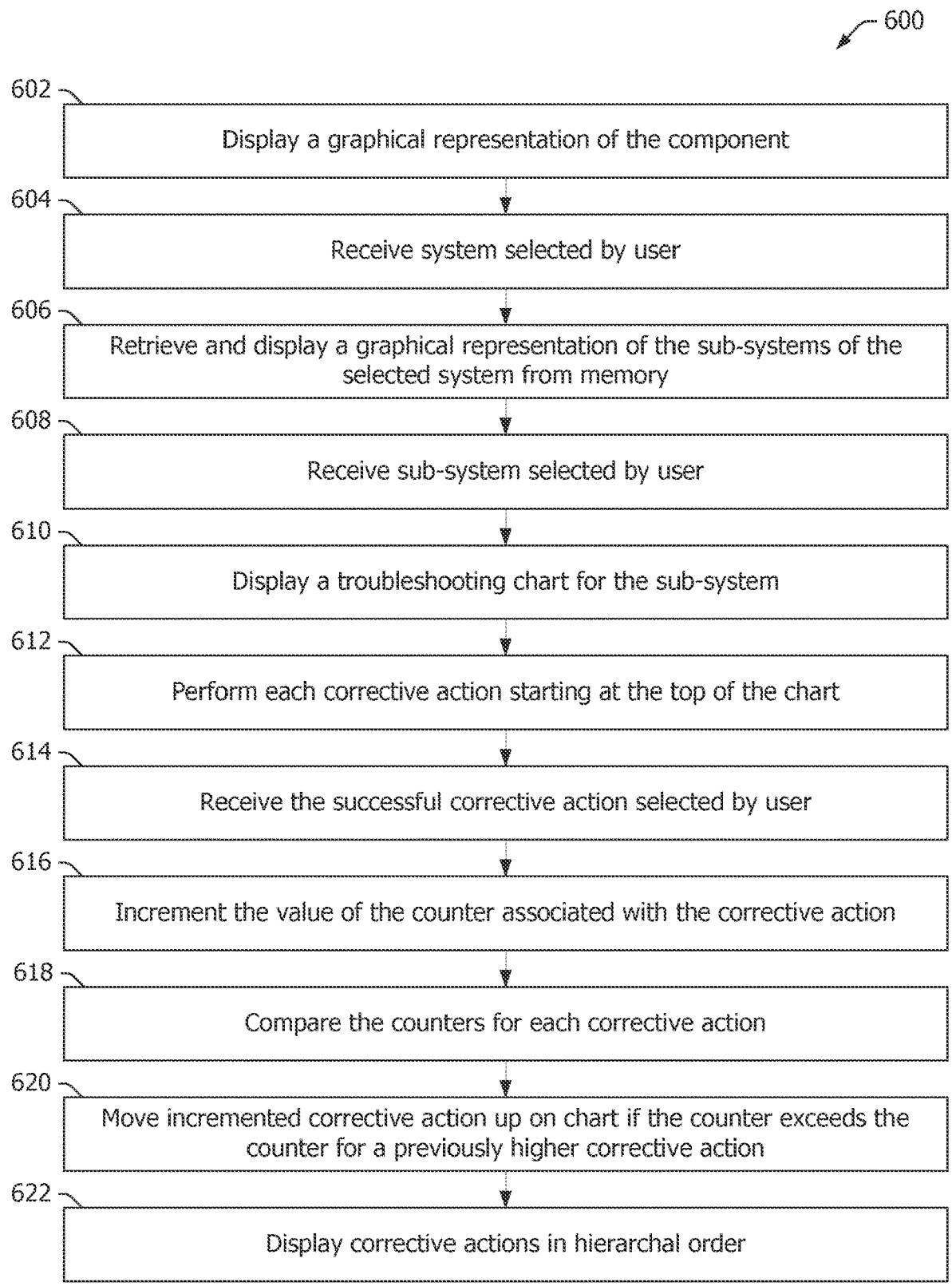
FIG. 6 is a flowchart of a method of generating a troubleshooting chart for a component.

FIG. 6 is a flowchart 600 for generating a troubleshooting chart for a component. In the exemplary implementation, the troubleshooting chart includes a column of known faults or problems associated with the selected sub-system and a column of known solutions or corrective actions associated with each fault. Each corrective action is associated with a counter and is given a first, or initial, value based on past usage or success. The initial value of the counter for each corrective action is determined by the application programmer. Alternatively, each corrective action may have an initial value of zero and may be set in a predetermined order. The values are stored on memory 510 of computing device 502 or may be stored on server computer device 306 (shown in FIG. 3). Initially, the chart is sorted in a default order with the most likely successful corrective action for the fault at the top.

Processor 505 (shown in FIG. 5) of computing device 502 (shown in FIG. 5) displays 602 a graphical representation of the component via media output component 515 (shown in FIG. 5). The graphical representation of the component's systems and sub-systems are stored in memory 510 (shown in FIG. 5). User 501 (shown in FIG. 5) selects an area of interest or a desired system included within the component in need of maintenance or repair using input device 520. Upon receiving 604 the selection by user 501, processor 505 retrieves 606 a graphical representation of the sub-systems of the selected system from memory 510 and displays the sub-systems using media output component 515. Upon receiving 608 a selection of a sub-system by user 501 using input device 520, processor 505 displays 610 a troubleshooting chart for the sub-system.

User 501 performs 612 each corrective action starting at the top of the troubleshooting chart. When a corrective action performed by user 501 is successful in correcting the fault, user 501 indicates which corrective action was successful to computing device 502 using input device 520. In the exemplary implementation, user 501 makes the indication to computing device 502 by selecting the successful corrective action on the troubleshooting chart and confirming the success when prompted by processor 505. The troubleshooting chart includes a selection for user 501 to select if none of the corrective actions on the troubleshooting chart are successful. In such an event, processor 505 transmits a notification to a chart manager so that an update to the chart can be made or a new solution can be researched.

Upon receiving 614 the successful corrective action selected by user 501, processor 505 increments 616 the value of the counter associated with the corrective action. Processor 505 then compares 618 the counters for each corrective action within the troubleshooting chart. If the counter for the incremented corrective action exceeds the counter for a previously higher corrective action on the chart, then the incremented corrective action is moved 620 up on the chart. The next time the chart for the specific system or sub-system is accessed by user 501, the corrective actions are displayed 622 in hierarchal order on the chart, with the corrective action having the highest counter at the top. As user 501 uses the chart over time, the most used and most relevant corrective actions become more accurate and appear closer to the top of the chart.

In the exemplary implementation, the troubleshooting chart and counters for each corrective action are stored in memory 510 of each computing device 502, enabling the chart to be tailored specifically to each user 501. The content of the troubleshooting charts is periodically updated with new faults and/or corrective actions. In the exemplary implementation, server computing device 306 (shown in FIG. 3) communicates with processor 505 via communication interface 525 (shown in FIG. 5) to notify that an update is available. Processor 505 notifies user 501 of the update, for example, by displaying a message on media output component 515. User 501 then connects to server computing device 306 and downloads the update data.

In one implementation, a history of corrective actions selected by user 501 is stored on memory 510 of mobile computing device 502. In the exemplary implementation, user 501 may share their history with another user for one or more specified faults. For example, a more experienced user 501 may have used the troubleshooting chart for hundreds of repairs on a specific sub-system. User 501 may then choose to share the list history with a less-experienced user or one who has been unsuccessful in finding a successful corrective action for the fault. In another implementation, when user 501 downloads the update data, processor 505 sends the history data to server computing device 306 to be used for determining future initial corrective action order or for other purposes. Moreover, in the exemplary implementation, user 501 may choose to clear the current list counters and restart from zero. The history is maintained in memory 510 for user 501 to access if so desired.

The advantages of this dynamic and user-based troubleshooting chart are that different environments and conditions may provide solutions in one location different than in other locations for the same fault. For example, a mechanically-minded user may look to certain solutions different than what an electrically-minded user might attempt. Alternatively, for example, in a cold, humid environment, a vehicle encounters faults such as rusting, moisture intrusion, cold bearings, and/or cold grease, whereas in a warm, dry environment, issues may include cracking, breaking, and parts becoming embrittled. However, if bearings freeze or crack, the same fault will occur as a machine will fail to rotate or will operate inefficiently. In the cold environment, the fault may be corrected by heating the grease, whereas in the warm environment, more grease may need to be applied. A user may share their list histories to assist users in other locations experiencing abnormal weather conditions or environments. Accordingly, because entities typically use the same troubleshooting chart at multiple locations, the troubleshooting chart is tailored to each user personally so that it is useful in any number of different environments.

An exemplary technical effect of the methods and systems described herein includes at least one of: (a) receiving, by a processor, an input from a user indicating a successful corrective action from the plurality of corrective actions on a troubleshooting chart; (b) incrementing, by the processor, a value of a counter associated with the successful corrected action; (c) comparing values for counters associated with each of the plurality of corrective actions; and (d) displaying the troubleshooting chart to the user with the plurality of corrective actions in hierarchal order based on the values of the counters.

As compared to known methods and systems for troubleshooting devices, the methods and systems described herein provide troubleshooting charts tailored to each user's technical background and past usage. The methods and systems described herein also provide troubleshooting charts that are customized to different physical and/or environmental conditions, where different solutions to a problem may be used. The personalization of a troubleshooting chart to a user enables the user to employ corrective actions for a fault that have the highest probability of success, resulting in greater efficiency and reduced time, cost, and danger of the maintenance process.

Implementations of the systems and methods described herein may embrace one or more computer-readable media, wherein each medium may be configured to include or includes thereon data or computer-executable instructions for manipulating data. The computer-executable instructions include data structures, objects, programs, routines, or other program modules that may be accessed by a processing system, such as one associated with a general-purpose computer capable of performing various different functions or one associated with a special-purpose computer capable of performing a limited number of functions. Computer-executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer-readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

The methods described herein may be encoded as executable instructions embodied in a computer readable medium, including, without limitation, a storage device or a memory of a computing device. Such instructions, when executed by one or more processors, cause the processor(s) to perform at least a portion of the methods described herein. As used herein, a "storage device" is a tangible article, such as a hard drive, a solid state memory device, and/or an optical disk that is operable to store data, such as computer-executable instructions.

The description of the different advantageous implementations has been presented for purposes of illustration and description, and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of prioritizing a plurality of maintenance corrective actions in a troubleshooting chart for a device, the method performed using a mobile computing device that includes a processor coupled to a memory, said method comprising:

receiving and storing, by the processor of the mobile computing device, initial corrective action data for the device from a server computing device, the initial corrective action data based on historical corrective action data received by the server computing device from a plurality of computing devices;

displaying, by the processor via a display device of the mobile computing device, an image of the device to a user, the image including a plurality of systems included in the device;

receiving, by the processor, a user selection of a system of the plurality of systems of the device, wherein the system selected by the user is displayed in the image and is experiencing a fault in need of corrective action;

generating, on the mobile computing device for display to the user, a first list of a plurality of corrective actions in a troubleshooting chart associated with the selected system, the plurality of corrective actions sorted according to a default order and generated based on the initial corrective action data;

performing, by the user, the plurality of corrective actions in the default order;

receiving, by the processor, an input from the user indicative of a successful corrective action that corrected the fault;

incrementing, by the processor, a value of a counter associated with the successful corrective action;

comparing values for counters associated with each of the plurality of corrective actions;

generating, on the mobile computing device for display to the user, upon subsequent selections of the system by the user when the fault is experienced, a second list of the plurality of corrective actions, the second list of the plurality of corrective actions sorted in hierarchal order based on the values of the counters;

performing, by the user, the plurality of corrective actions, in the hierarchal order, on the system;

transmitting, by the processor to the server computing device, updated historical corrective action data representing which of the plurality of corrective actions was the successful corrective action; and resetting, by the processor based on user input, the values of the counters associated with the plurality of corrective actions.

2. A method in accordance with claim 1, further comprising assigning an initial value to each counter based on a predicted success of each corrective action.

3. A method in accordance with claim 1, further comprising assigning an initial value to each counter based on past success of each corrective action.

4. A method in accordance with claim 1, further comprising:
displaying a graphical representation of a plurality of sub-systems for the selected system;
receiving a sub-system selected by the user; and
displaying the troubleshooting chart associated with the selected sub-system.

5. A method in accordance with claim 1, further comprising:
receiving, by the processor, an update message indicating that update data is available for the troubleshooting chart, the update message received from the server computing device via a communication interface coupled to the processor;
displaying the update message to the user; and
retrieving the update data from the server computing device upon receiving instruction from the user.

6. A method in accordance with claim 1, further comprising storing incrementation history data associated with an incrementation history of each counter on a memory coupled to the processor.

7. A method in accordance with claim 6, further comprising transmitting the incrementation history to the server computing device using a communication interface coupled to the processor.

8. A method in accordance with claim 6, further comprising transmitting the incrementation history to a second mobile device associated with at least one second user using a communication interface coupled to the processor, wherein the incrementation history data is applied to the counters stored in a second memory associated with the second mobile device.

9. A method in accordance with claim 8, further comprising transmitting environmental data corresponding to the incrementation history data to the second mobile device using the communication interface coupled to the processor.

10. A computer device for use in prioritizing a plurality of maintenance corrective actions in a troubleshooting chart for a component, said computer device comprising:
a memory for storing data; and
a processor in communication with said memory, said processor programmed to:
receive and store initial corrective action data for the component from a server computing device, the initial corrective action data based on historical corrective action data received by the server computing device from a plurality of computing devices;
display an image of the component to a user via a media output component coupled to said processor, the image including a plurality of systems included in the component;
receive a user selection of a system of the plurality of systems of the component, wherein the system selected by the user is experiencing a fault in need of corrective action, the user selection received via an input device coupled to said processor;
generate a first list of a plurality of corrective actions in the troubleshooting chart associated with the selected system using the media output component, the plurality of corrective actions sorted according to a default order and generated based on the initial corrective action data;
receive an input from the user indicating a successful corrective action, among the plurality of corrective actions performed in the default order, that corrected the fault;
increment a value of a counter associated with the successful corrective action;
compare values for counters associated with each of the plurality of corrective actions;
generate, upon subsequent selections of the system by the user when a fault is experienced, a second list of the plurality of corrective actions, the second list of the plurality of corrective actions sorted in hierarchal order based on the values of the counters;
perform, by the user, the plurality of corrective actions, in the hierarchal order, on the system;
transmit, to the server computing device, updated historical corrective action data representing the recommended corrective action of the plurality of corrective actions was the successful corrective action; and
reset, based on user input, the values of the counters associated with the plurality of corrective actions.

11. A device in accordance with claim 10, wherein said processor is further programmed to assign an initial value to each counter based on one of a predicted success and a past success of each corrective action.

12. A device in accordance with claim 10, wherein said processor is further programmed to:
   display a graphical representation of a plurality of sub-systems for the selected system;
   receive a sub-system for troubleshooting selected by the user;
   retrieve a troubleshooting chart associated with the selected sub-system from said memory; and
   display the troubleshooting chart associated with the selected sub-system.

13. A device in accordance with claim 10, wherein said device is communicatively coupled to the server computer device via a communication interface, said processor is further programmed to:
   receive an update message indicating that update data is available for the troubleshooting chart from the server computer device;
   display the update message to the user using a media output component coupled to said processor; and
   retrieve the update data from the server computer device upon receiving a command input by the user.

14. A device in accordance with claim 10, wherein said processor is further programmed to store incrementation history data associated with an incrementation history of each counter on said memory.

15. A device in accordance with claim 14, wherein said processor is further programmed to transmit the incrementation history data to the server computing device using a communication interface coupled to said processor.

16. A device in accordance with claim 14, wherein said processor is further programmed to transmit the incrementation history data to a second mobile device associated with at least one second user using a communication interface coupled to said processor, wherein the incrementation history data is applied to the counters stored in a second memory associated with the second mobile device.

17. A device in accordance with claim 16, wherein said processor is further programmed to transmit environmental data corresponding to the incrementation history data to the second mobile device using the communication interface coupled to said processor.

18. A non-transitory computer-readable storage medium having encoded thereon computer readable instructions that are executable by a processor to perform functions comprising:
   receiving and storing initial corrective action data for a component from a server computing device, the initial corrective action data based on historical corrective action data received by the server computing device from a plurality of computing devices;
   displaying an image of the component, the image including a plurality of systems included in the component;
   receiving a user selection of a system of the plurality of systems of the component, the system selected by the user experiencing a fault in need of corrective action;
   generating a first list of a plurality of corrective actions in a troubleshooting chart for the selected system, the plurality of corrective actions sorted according to a default order and generated based on the initial corrective action data;
   receiving an input from a user indicating a successful corrective action, among the plurality of corrective actions performed in the default order, that corrected the fault;
   incrementing a value of a counter associated with the successful corrective action;
   comparing values for counters associated with each of the plurality of corrective actions;
   generating, upon subsequent selections of the system by the user when a fault is experienced, a second list of the plurality of corrective actions, the second list of the plurality of corrective actions sorted in hierarchal order based on the values of the counters;
   performing, by the user, the plurality of corrective actions, in the hierarchal order, on the system;
   transmitting, by the processor to the server computing device, updated historical corrective action data representing the recommended corrective action of the plurality of corrective actions was the successful corrective action; and
   resetting, by the processor based on user input, the values of the counters associated with the plurality of corrective actions.

19. A computer-readable storage device in accordance with claim 18, wherein the instructions are executable by the processor to perform functions comprising assigning an initial value to each counter based on one of a predicted success and a past success of each corrective action.

20. A computer-readable storage device in accordance with claim 18, wherein the instructions are executable by the processor to perform functions comprising:
   displaying a graphical representation of a plurality of sub-systems for the selected system;
   receiving a selection of a sub-system selected by the user; and
   displaying the troubleshooting chart associated with the selected sub-system.

* * * * *